July 31, 1923.
G. HAIL
INVISIBLE PIPE JOINT
Filed Dec. 2, 1921
1,463,692
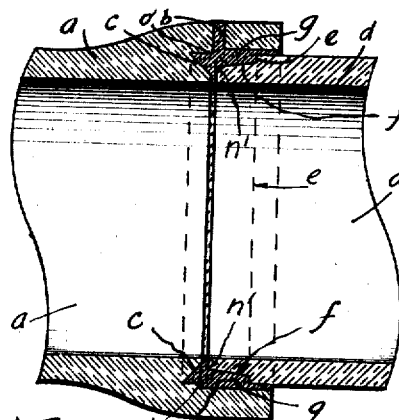
Fig. 1.
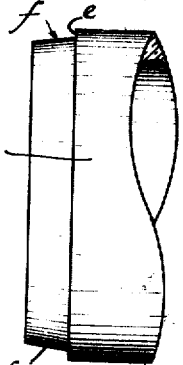
Fig. 3.
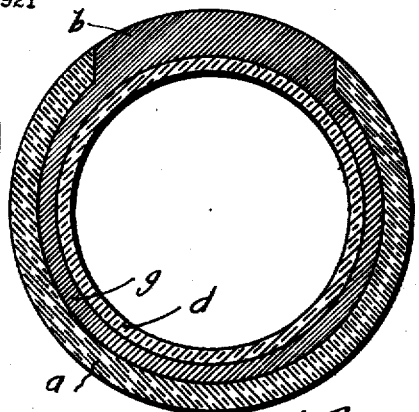
Fig. 2.
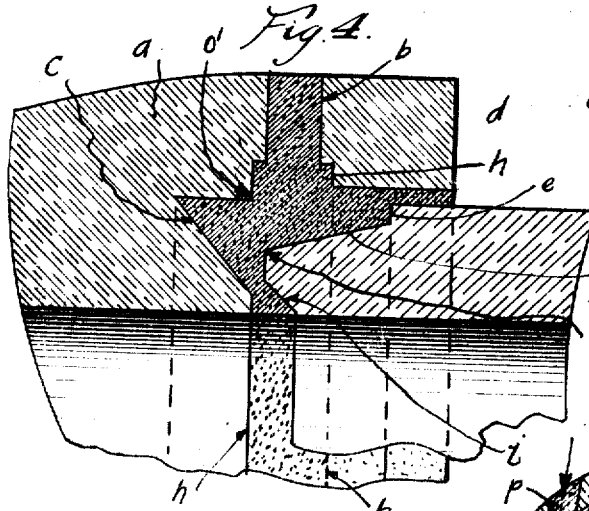
Fig. 4.
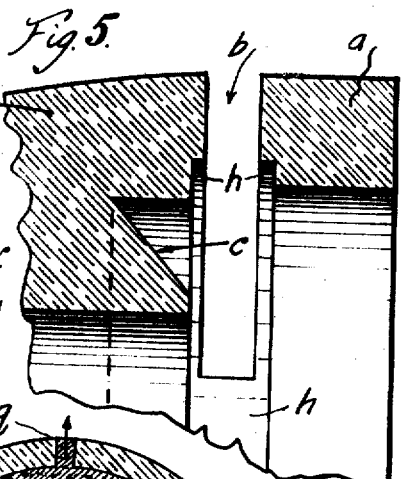
Fig. 5.
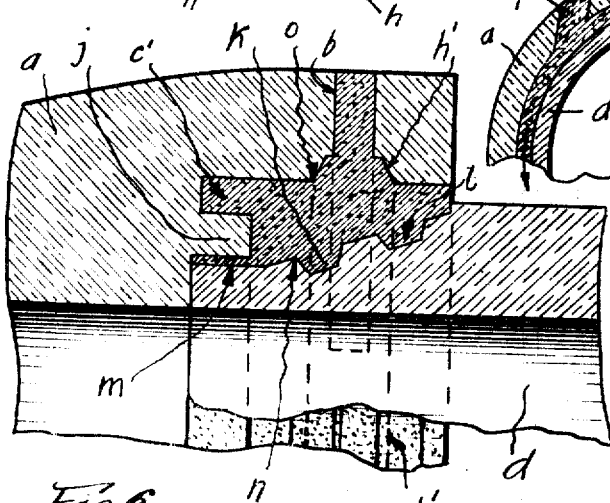
Fig. 6.
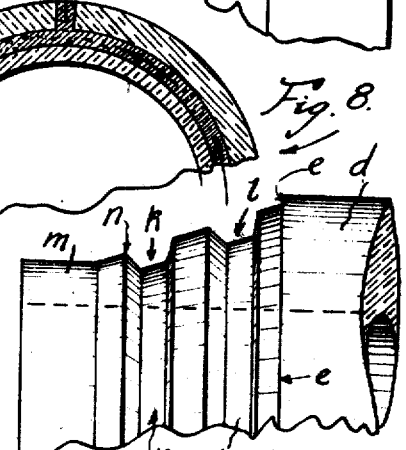
Fig. 8.
Fig. 7.
Inventor
Gustav Hail
F. J. Geisler
by Atty.

Patented July 31, 1923.

1,463,692

UNITED STATES PATENT OFFICE.

GUSTAV HAIL, OF PORTLAND, OREGON.

INVISIBLE PIPE JOINT.

Application filed December 2, 1921. Serial No. 519,410.

*To all whom it may concern:*

Be it known that I, GUSTAV HAIL, a citizen of the United States and a resident of Portland, county of Multnomah, and State of Oregon, have invented a certain new and useful Improvement in Invisible Pipe Joints, of which the following is a specification.

The object of my invention is to provide an internal, invisible joint for standard bell and spigot end pipes. In the past, pipes with internal joints were used which did not conform with the standards set forth in the local codes or else, standard pipes were used and the joint was made with a big ring of binding material wiped on the outside of the pipe.

By my invention I have provided a joint which can be filled with a minimum of cement, can be filled very quickly, and in tests has stood all tests required of water conduits and sewer pipes.

The one big disadvantage of wiping the joint on the outside is that large ditches have to be dug underneath each joint so that the cement can be packed securely around and underneath the pipe and the ditch must be left until the pipe is set so that inspection can be readily made.

This not only caused a great deal of labor, a considerable amount of loss of cement, and a natural racking which threw the sections of pipe out of alinement with each other, but also, made a poor joint because the cement would fall off on the underside of the pipe as it was held in position merely by its adhesion to the pipe.

The attempts at providing double bell end pipes and straight section pipes naturally did not entirely eliminate these difficulties because they could not be used under the codes used by the different localities which require that pipe be made with one bell and one spigot end. They also did not make a proper seal because they were not so designed that the expansion and contraction of heat could take place without breaking the joint. Another difficulty was that each section of pipe did not take the full weight of itself independently of the other sections and frequently the pipes would tend to slip away from each other when too much weight was placed on a single section of pipe. All these difficulties I have overcome in the device which I have shown in the following drawings, in which:

Fig. 1 is a longitudinal cross sectional view of one type of my invention and shows the periphery of the joint when the bell and spigot ends of the sections are alined together;

Fig. 2 is a cross sectional view taken on the line 2—2 of Fig. 1 and is a view at right angles to the view shown in Fig. 1 and shows the pouring slot and the relation of the joint filler in relation to the ends of the two pipes;

Fig. 3 is a detailed view showing the spigot end of the pipe;

Fig. 4 is a detailed cross sectional view showing another adaption of my invention in which the type of joint has been changed slightly;

Fig. 5 is a detailed view showing the bell end separately;

Fig. 6 is a detailed cross sectional view showing another adaption of my invention;

Fig. 7 is a detailed view showing the spigot end of the joint shown in Fig. 6; and Fig. 8 is a detailed cross sectional view showing a pouring end or outlet holes to be used when the cement is to be forced in by means of a pump.

In the joint shown in Fig. 1 the bell end $a$ is made with a pouring slot $b$, and with a wedge shaped notch $c$. The spigot end $d$ is made with a shoulder $e$ and with a tapered projection $f$ and when the spigot end is placed in the bell end and the binder $g$ is poured, the joint resembles the cross sectional view shown in Fig. 1. Fig. 4 is a slight change over Fig. 1, inasmuch as a channel $h$ has been provided. It has been cut away and leaving shoulders, and the spigot end has been slightly tapered away on the inside also leaving an inside bevel $i$ which allows for a greater contact of binder with the pipe so that a greater adhesion will take place.

In Fig. 6 a slightly tapered channel $h'$ has been provided and on the inside of the bell end $c'$ has been made square instead of wedge shaped as notch $c$ in the original arrangement. This leaves a projection $j$ in the bell end $a$. The spigot end is made with a taper as before but two declivities $k$ and $l$ are made and a straight section $m$ is added to extend underneath the projection $j$. It can be seen that the cement flowing into these declivities will tend to hold the weight of each section separately and a longitudinal strain due to contraction and expansion will cause the break to come between the point *n* and the point *o*. In the other variations of my invention the break will come on similar points *n'* and *o'* so that any hair line crack which will come, due to this elongation and contraction of the pipe will not break the joint, but will merely cause the crack inside the joint where no harm will be done.

One method of forcing the cement into this internal joint is by means of a force pump. In Fig. 8 I have shown a means to do this with my type of joint. The tube of the pump can be inserted in the hole *p* and the liquid binder can be forced around until it flows out of the hole *q* which can be then plugged and further pressure applied so that the cement will be forced into every crack and crevice.

In all of my experiments I have found that the cement being allowed to set will thoroly unite with the pipe to form into an integral mass and thus the joint is stronger than the pipe itself. The declivities which I have noted in the different types of my invention hold the pipe against any longitudinal slipping of the pipe and thus to remove one pipe from the other after the binder has set requires a shearing action of the binder to release the joint.

These pipes can be manufactured by all standard molds and machinery and do not require special tools because of their general standard sizes and contours, and thus are adaptable to be manufactured by any plant. This is the one big feature over other types of pipe which use an internal joint and also that my pipe can be used for irrigation and pressure work, as I have tested them out against pressure greater than eighty pounds to the square inch internal pressure without affecting the joint in the least.

Altho I have not indicated reinforcing material in my pipes it is to be understood that this can readily be done as my pipes are especially designed to facilitate this. The materials used for making the pipes can be any of the standard materials such as concrete, clay, wood or iron, or any other such substance.

The illustrations and descriptions above given are merely intended to show a practical mode of construction of my device. The particular details of construction above described are, however, variable to suit the ideas of the manufacturer providing such variations retain the essential features of my invention.

I claim:

In a conduit made in sections, the end of one section being tapered and then extended coaxially with the body portion of said section, the tapered portion being formed with annular grooves, the end of the opposite section being enlarged and provided with a receiving recess greater in diameter than the maximum diameter of the adjacent section and adapted to receive the tapered portion thereof, the end wall of the recess forming an abutment for the end of the adjacent tapered section and having an annular flange which overlies and is spaced from the extended portion of said adjacent section, the enlarged portion of the section having a filling opening, and sealing material in the cavity formed between the tapered end and the enlarged end of the two sections to seal and hold the two sections together.

GUSTAV HALL.